Nov. 10, 1959 W. T. EVANS 2,912,060
SEISMIC PROSPECTING
Filed April 19, 1955
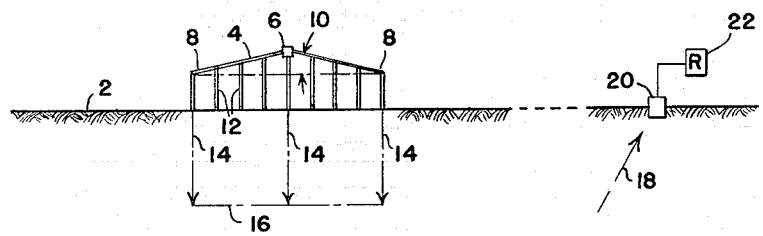
FIG. 1.
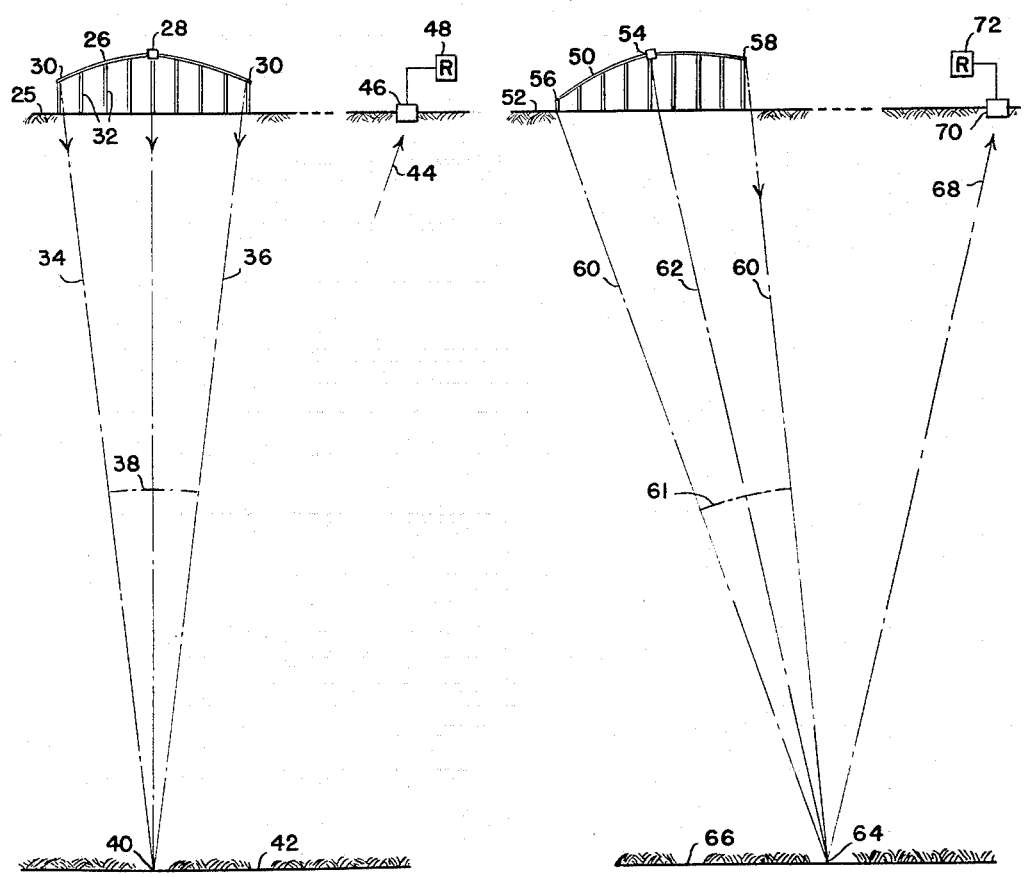
FIG. 2.
FIG. 3.
INVENTOR.
WILLIAM T. EVANS
BY
ATTORNEYS

United States Patent Office 2,912,060
Patented Nov. 10, 1959

2,912,060
SEISMIC PROSPECTING

William T. Evans, Beaumont, Tex., assignor to Sun Oil Company, Philadelphia, Pa., a corporation of New Jersey Application April 19, 1955, Serial No. 502,333

2 Claims. (Cl. 181—.5)

This invention relates to seismic prospecting and has particular reference to the creation of seismic disturbances for the carrying out of seismic reflection prospecting.

In the past it has been customary to fire in the vicinity of the surface of the ground, and generally in shot holes, relatively large quantities of explosive such as dynamite in concentrated charges. When this is done only a very small percentage of energy is actually delivered through the earth in the form of a useable disturbance. Much of the energy of the explosion is dissipated in local destruction of the surrounding earth, the elastic limit of which is exceeded through a considerable region around the charge. The failure to secure any large percentage input of useful energy was originally ascribed to the presence of the weathered layer adjacent to the surface of the ground, the assumption being that this layer would serve as an absorbing cushion so that only a minor portion of the energy would actually reach the harder, deeper rocks through which good transmission would occur. However, it was noted that the weathered layer was a quite effective conductor of seismic disturbances of small amplitude by reason of the fact that its presence involved little loss of energy reflected from deep boundaries reaching a receiver as compared with the reception of energy by a receiver located in a deep hole extending below the weathered layer. That the weathered layer is not per se an extremely poor conductor of seismic disturbances has been further demonstrated by the effective transmission of disturbances originating in the air so that the weathered layer itself would not be subjected to stresses beyond its elastic limit. The last mentioned practice, accordingly, has found favor in view of its saving of explosive for a given energy input. However, the firing of concentrated charges in air is objectionable in view of the noise and shock which such firing produces.

To avoid the firing of concentrated charges in the air the use of explosive in elongated form has been suggested, for example, in the cord-like form known as primacord which has a rate of explosive propagation of approximately 20,000 feet per second. Alternatively, the use of a plurality of discrete small charges located over a relatively extended area has been suggested. While for the present invention the use of primacord is preferred, the possibility of using a plurality of discrete charges is recognized and the invention should not be considered as being limited by the use of primacord.

As previously noted, the cord-like explosive has a rate of explosion propagation of the order of 20,000 feet per second, whereas the velocity through the air of the shock wave resulting from the detonation of the cord-like explosive is of the order of 1,100 feet per second.

It is the primary object of this invention to provide a method of seismic prospecting in which there is detected reflections from wave fronts in the earth having predetermined form and direction of travel. Additionally, it is a further object of the invention to provide a method of seismic prospecting in which the detected reflections are from seismic waves in the earth having, in addition to desired form and direction of travel, a predetermined focal point in the earth.

The various objects of the invention will be apparent from the foregoing and from the following description when read in conjunction with the accompanying drawings, in which:

Figure 1 is a vertical section illustrating one array of elongated cord-like explosive positioned above the earth in accordance with the invention;

Figure 2 is a vertical section through an alternative form of explosive array; and Figure 3 is a vertical section through still another form of explosive array.

In Figure 1 there is shown positioned above the surface of the earth 2 an elongated cord-like explosive 4 having its central portion positioned a maximum distance above the earth and connected to a detonator 6 and having its end portions 8 positioned closest to the earth. The cord-like explosive is mounted on suitable posts 12 and supported so that the two legs 6—8 of the explosive are each in substantially a straight line extending outwardly and downwardly from the central portion. The angle of each of these legs with a horizontal, as indicated at 10, is approximately 3° when the rate of explosive propagation of the cord-like explosive is in the order of 20,000 feet per second and it is desired to produce a horizontal wave front in the earth such as is indicated at 16. This wave front will, of course, be moving downwardly into the earth as indicated by the lines 14.

The wave 16 will be reflected from subsurface strata and a portion of this reflection passing upwardly, as indicated at 18, will be detected by a detector 20. The output of the detector 20 is recorded by means of a recorder 22 in the conventional fashion.

This particular arrangement has the advantage in producing a plane wave front in the earth of high intensity due to the particular array of the explosive and the fact that the charge by being positioned above the earth does not dissipate its energy in crushing the surrounding earth. This type of array is easily set up and does not have the objectionable disadvantages of the noise and shock which result from the firing of concentrated charges in the air.

If desired, the elongated cord-like explosive may be supported by an elastic cord or similar supporting means between the posts 12 in order that the position of the cord is not disturbed during the firing. In most cases, however, the rate of explosion propagation is so rapid that relatively little displacement will occur in the cord-like explosive during the progressive explosion thereof.

In Figure 2 there is shown a modification of the invention in which there is positioned above the surface of the earth 25 a length of cord-like explosive 26 in the form of a segment of a parabola. In the central portion of the segment there is connected a detonator 28 and the end portions 30 of the parabola are closest to the earth. The cord-like explosive 26 is supported in parabolic form by means of posts 32. When the cord-like explosive 26 is fired, the energy waves emanating therefrom move downwardly into the earth in a converging direction as indicated by the lines 34 and 36 and at some point below the surface of the earth the wave front will have the appearance as indicated by the line 38. The particular curvature of the parabolic segment may be selected to provide a focusing of the energy front at a point 40 at the surface of a deep earth strata 42. It will be evident that in addition to the depth in the earth of the point 40 the refractive effect of the surface of the earth 25 on the waves entering the earth must be taken into account in the determination of the curvature of the parabolic segment represented by the cord-like explosive 26.

Among the waves reflected by the strata 42 will be waves 44 arriving at a detector 46 shown positioned at the surface of the earth 25 and having its output connected to a recorder 48 by means of which detected signals are recorded in the conventional manner. It will be evident that this arrangement provides for both a high intensity and a locally confined wave front impinging upon a predetermined earth strata.

The arrangement shown in Figure 3 serves to produce a wave front having a predetermined non-vertical direction of travel in the earth as well as a predetermined focal point in the earth. In this arrangement a cord-like explosive 50 is positioned above the surface of the earth 52 in the form of a segment of a parabola having a detonator 54 connected to the midpoint of the segment and having the end points 56 and 58 of the parabolic segments positioned at different elevations above the earth. Thus there is provided an elongated cord-like explosive in the form of a parabolic segment so positioned as to provide a wave front having the appearance as indicated by the line 61 passing into the earth as indicated by the lines 60 and 62 and converging as indicated by the lines 60 at a point 64 on a deep strata 66. Some of the waves reflected from the strata and passing upwardly to the surface of the earth as indicated at 68 will arrive at a detector 70 the output of which is recorded by a recorder 72 in the conventional fashion. It will be evident that if the angle formed by the line 62 with the surface of the strata 66 is the same as that formed by the line 68 with the strata 66 there will be directed to the detector 70 a maximum amount of reflected energy. This arrangement provides, therefore, not only for directing into the earth the maximum amount of energy produced by a detonation but, furthermore, serves to direct to a detector a maximum intensity reflection of that energy from a deep earth strata. It will, of course, be evident that by varying the inclination of the parabolic segment represented by the cord-like explosive 50 and by varying the curvature of this parabolic segment the wave front produced can be focused at any desired depth in the earth and can be directed in any desired non-vertical direction of travel so as to accomplish the direction of a maximum amount of reflected energy to a recorder positioned at the surface of the earth.

As will be evident, the invention may be applied to prospecting over water covered areas by supporting a desired array of the cord-like explosive material above buoyant floats.

What is claimed is:

1. The method of seismic prospecting comprising providing above the surface of the earth a curved array of elongated cord-like explosive involving the arrangement of the explosive arched above the earth in a plane extending vertically through the explosive, producing a progressive explosion through the array by firing the cord-like explosive, locating the various points in the array at positions spaced above the surface of the earth to provide, in conjunction with the time displacement of explosion between portions of the array and the rate of propagation through the air of the shock wave resulting from the explosion, a seismic wave front in the earth having a predetermined curved form, direction of travel and focal point in the earth, and detecting reflections of said seismic wave from said focal point.

2. The method of seismic prospecting comprising providing above the surface of the earth a curved array of elongated cord-like explosive involving the arrangement of the explosive arched above the earth in a plane extending vertically through the explosive, producing a progressive explosion through the array by firing the cord-like explosive, locating the various points in the array at positions spaced above the surface of the earth to provide, in conjunction with the time displacement of explosion between portions of the array and the rate of propagation through the air of the shock wave resulting from the explosion, a seismic wave front in the earth having a predetermined direction of travel and focal point in the earth and being in the form of a circular arc having its center of radius at said focal point, and detecting reflections of said seismic wave from said focal point.

References Cited in the file of this patent

UNITED STATES PATENTS

| | | |
|---|---|---|
| 1,899,970 | Mc Collum | Mar. 7, 1933 |
| 2,099,837 | Blau | Nov. 23, 1937 |
| 2,693,245 | Hawkins | Nov. 2, 1954 |
| 2,706,011 | Bayhi | Apr. 12, 1955 |
| 2,724,452 | Sorge | Nov. 22, 1955 |